Nov. 2, 1948.    M. K. KUTHER ET AL    2,452,666
FISH CANNING MACHINE
Filed June 23, 1944    3 Sheets-Sheet 2

INVENTORS
James Leonard Smith
BY Max K. Kuther
J. E. Trabucco
ATTORNEY.

Nov. 2, 1948.  M. K. KUTHER ET AL  2,452,666
FISH CANNING MACHINE
Filed June 23, 1944  3 Sheets-Sheet 3
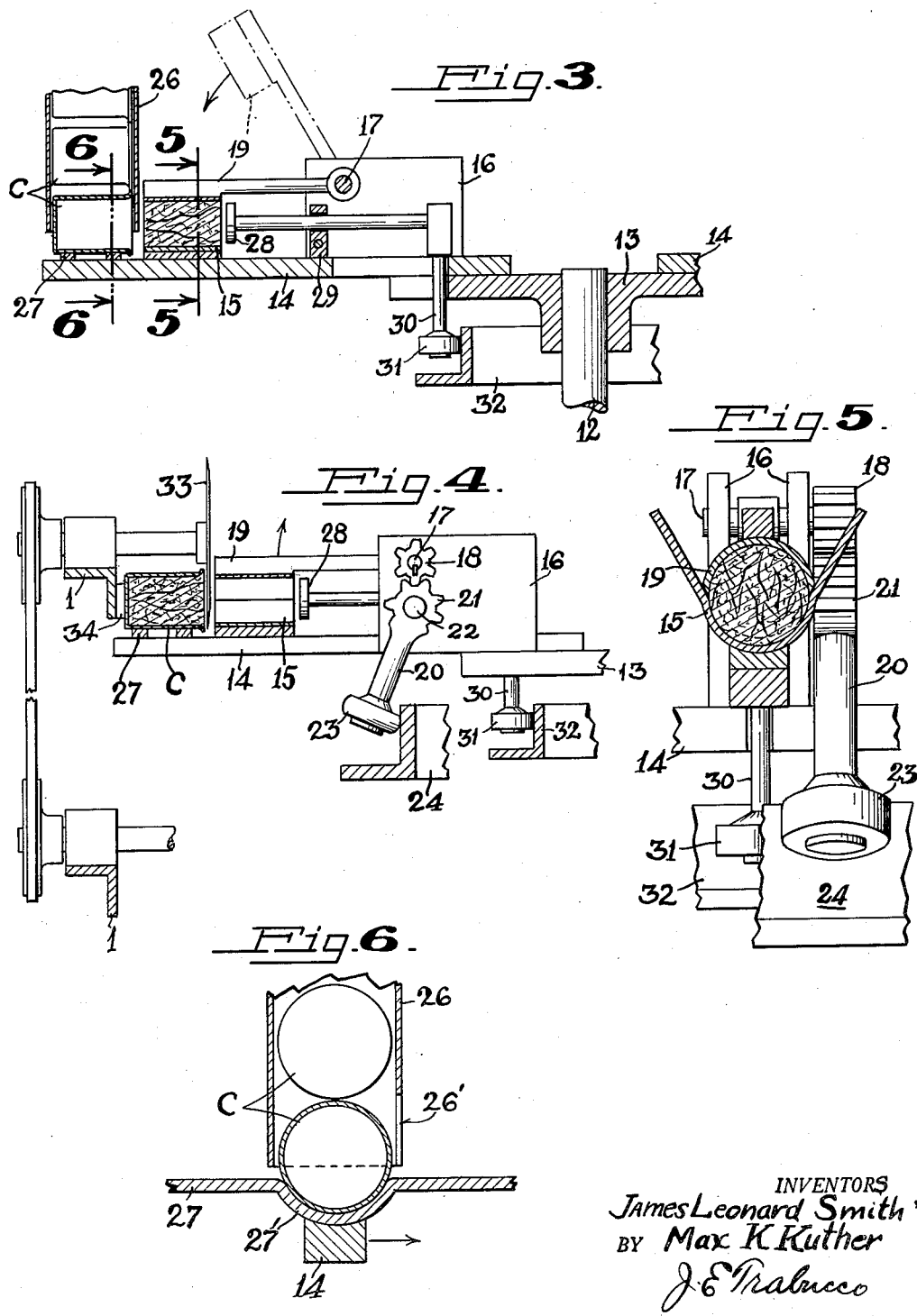
INVENTORS
James Leonard Smith and
BY Max K Kuther
J.E. Trabucco
ATTORNEY.

Patented Nov. 2, 1948

2,452,666

UNITED STATES PATENT OFFICE 2,452,666

FISH CANNING MACHINE

Max K. Kuther, Monterey, and James Leonard Smith, Pacific Grove, Calif.

Application June 23, 1944, Serial No. 541,822

5 Claims. (Cl. 226—103)

This invention relates to improvements in canning machines.

An object of our invention is to provide an improved canning machine embodying novel automatic means by which fish or other produce to be canned is deposited into suitable molds where it is shaped and compressed for subsequent ejection into cans.

Other objects and advantages will be pointed out hereinafter, indicated in the appended claims, or will be obvious to one skilled in the art upon an understanding of the present disclosure. For the purpose of this application we have elected to show herein certain forms and details of a fish canning machine representative of our invention; it is to be understood, however, that the embodiments of our invention herein shown and described are for the purpose of illustration only, and that therefore they are not to be regarded as exhaustive of the variations of the invention, nor are they to be given an interpretation such as might have the effect of limiting the claims short of the true and most comprehensive scope of the invention in the art.

In the accompanying drawings:

Fig. 3 is an enlarged sectional view taken longitudinally through one of the radial arms of the rotatable carrier table;

Fig. 4 is an enlarged sectional view showing the means employed for trimming fish protruding from the cans and also the means for transferring a number of compressed fish from a receiving device to a can;

Fig. 5 is a sectional view taken on the line 5—5 of Fig. 3; and

Fig. 6 is a sectional view taken on the line 6—6 of Fig. 3.

Figure 1:
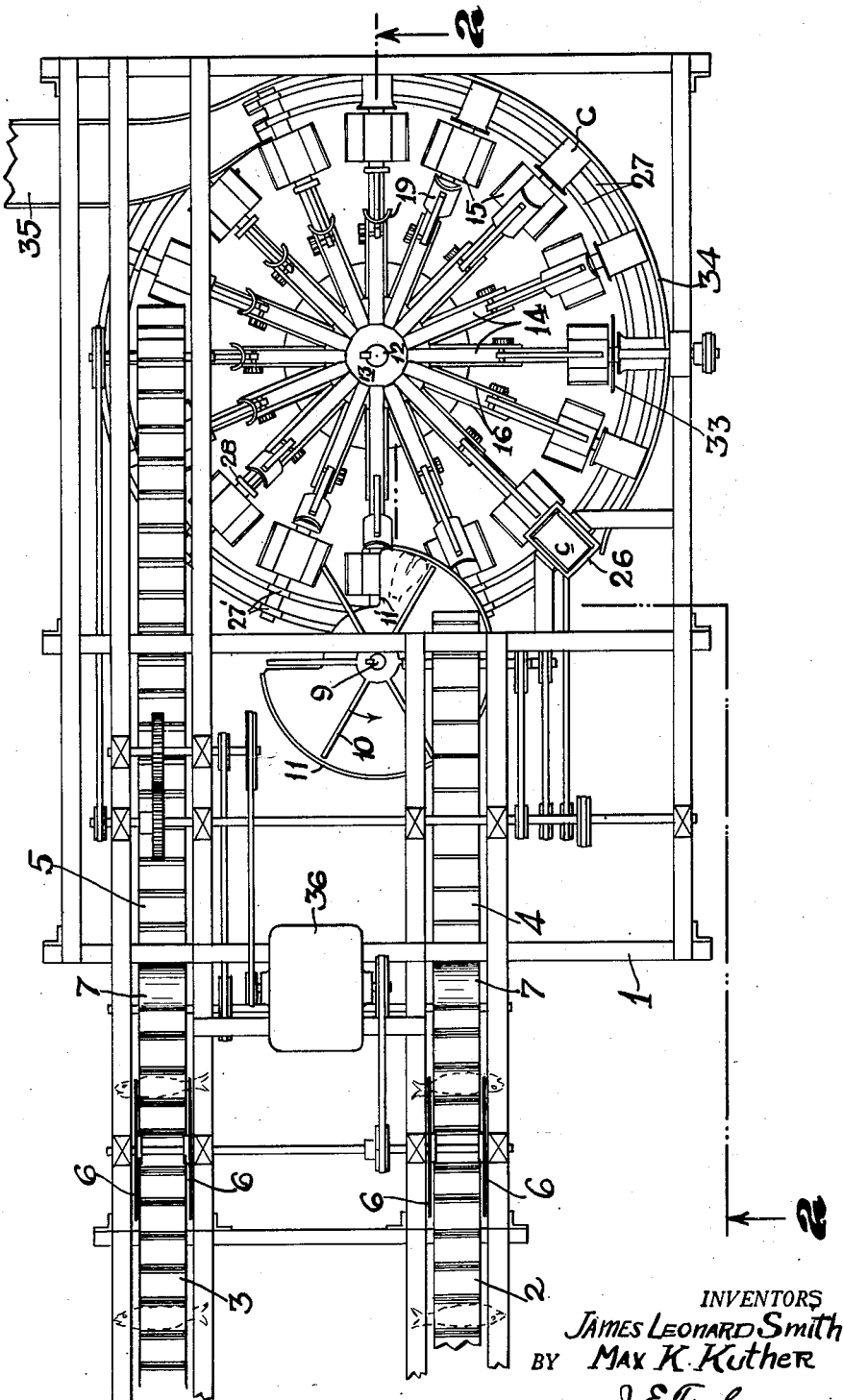
Fig. 1 is a plan view of a fish canning machine embodying the preferred principles of our invention.
Figure 2:
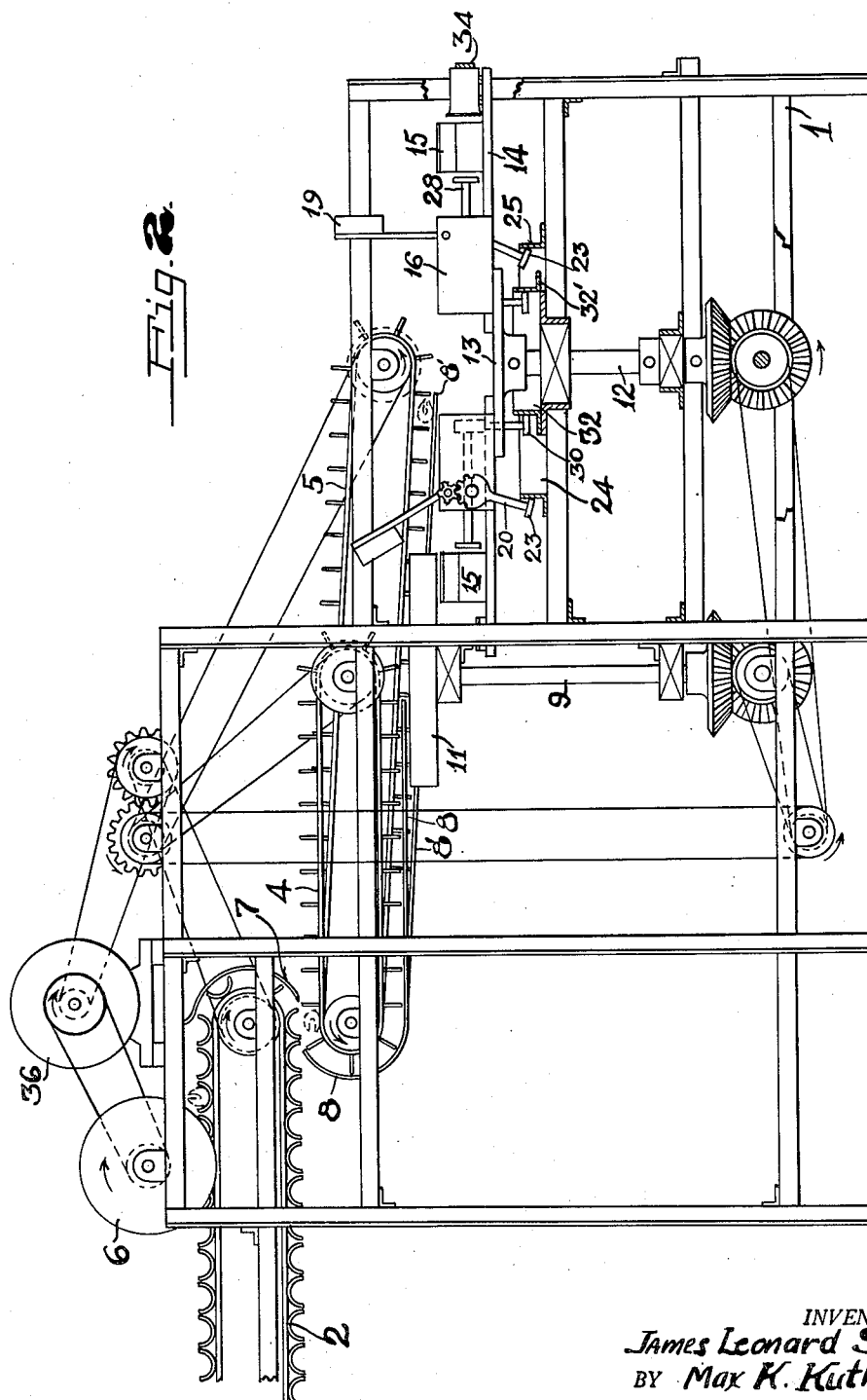
Fig. 2 is a sectional view taken substantially on the line 2—2 of Fig. 1.

Referring to the drawings, the numeral 1 designates a suitable frame for supporting the various parts of the machine. At one end of the frame are mounted two fish conveyors 2 and 3 each of which comprises a series of concave fish holding members secured to an endless belt. Fish, previously selected for size and in a suitably cleaned condition, are placed with their tails pointed inwardly, by hand or other means, on the conveyors 2 and 3 for delivery to two endless conveyors 4 and 5, each of which is provided with spaced projecting members arranged at predetermined distances from one another. Pairs of spaced circular knives 6 are arranged at opposite sides of the conveyors 2 and 3 for cutting the heads and tails from the fish as they are conveyed thereto. The fish are directed downwardly by curved deflector plates 7 onto the conveyors 4 and 5 after they fall by gravity from the conveyors 2 and 3. The spaced projecting members of the conveyors 4 and 5 are so arranged with respect to one another that each space therebetween is adapted to receive a single fish as it drops from the conveyors 2 and 3. Extending around one end and beneath each of the conveyors 4 and 5, respectively, are fish supporting plates 8 and 8', which terminate at predetermined delivery points. The plates 8 and 8' are arranged in positions whereby they receive and support the fish falling from the conveyors 4 and 5. The spaced projecting members of the conveyors 4 and 5 cause the fish positioned therebetween to be carried along the supporting plates 8 and 8' to the ends thereof, at which points they are discharged therefrom and fall by gravity onto other parts of the apparatus as will be later described.

Secured to a vertical shaft 9 is a rotatable star wheel 10 having a predetermined number of uniformly spaced radial members which are arranged to rotate within an open top receptacle 11. The fish from the conveyor 4 are directed by the plate 8 onto the bottom of the receptacle 11 and the radial members of the wheel 10 slide or carry them in a clockwise direction to a discharge opening 11' in the bottom of the said receptacle through which they then drop. The movement of the conveyor 4 and the rotation of the wheel 10 are so synchronized as to provide for the depositing of a certain number of fish between each of the radial members. In the particular example herein illustrated there are two fish dropped between each of the wheel's radial members.

Secured to a vertical shaft 12 is a rotatable carrier table 13 carrying a plurality of radial supporting arms 14 (here shown as sixteen in number) which are uniformly spaced one from another. Each of the radial supporting arms 14 has an open top fish receiver 15 secured thereto. The fish receivers 15 are each open at opposite ends, and each is preferably formed with a central semicircular part which is slightly smaller in size than the corresponding part of a can used in the canning operation, and each receiver also has side wings which are arranged in upwardly and outwardly inclined positions. The circular counter-clockwise path through which the fish receivers 15 travel is directly beneath both the discharge end of the longer fish supporting plate 8' and the discharge opening 11' of the receptacle 11. The movement of the conveyor 5 and the rotation of the table 13 are synchronized so that a predetermined number of fish are deposited into each fish receiver 15 as it passes under the discharge end of the supporting plate 8'. In the particular example herein illustrated, there are two fish deposited with their larger ends disposed outwardly into each fish receiver from the supporting plate 8'. When each fish receiver 15 having the two already deposited fish therein reaches the discharge opening 11' of the receptacle 11, there will be deposited therein from the said receptacle two additional fish, making in all four fish. The position of the fish discharged from the receptacle 11 into each receiver will be such that their larger or head ends are pointed inwardly in the opposite direction to the two fish previously entering the receiver from the plate 8'. The counter-clockwise movement of the wheel 10 is so timed with respect to the similar movement of the table 13 and the arms 14 that two fish from the receptacle 11 are discharged into each receiver 15 when it reaches a position directly below the point of discharge. The inclined side wings of each of the receivers 15 provide suitable means for directing the received fish into the central part of the receiver where they are subsequently compressed. Associated with each fish receiver 15 is means for compressing the fish into a compact package prior to their being transferred into a can. The various fish compressing means being the same, a description of one will suffice for all. Secured to and extending upwardly from the opposite side edges of each arm 14 are spaced supports 16. Secured to a pivotal shaft 17 mounted on the supports 16 is a gear 18 and a fish compressing member 19, the latter having a semicircular end part which is of substantially the same shape as the central part of each fish receiver 15. The fish compressing member 19 is adapted to move downwardly to a position where it engages with the fish receiver 15. When the receiver and the compressing member are in engaging positions, they form a cylindrical device, open at its ends, within which the four fish may be compressed prior to their being transferred into a can. (See Figs. 3 and 4.) The fish compressing member 19 is moved upwardly and downwardly with timed reciprocating motion by means of a lever 20 having a gear 21 at one end which is in mesh with the gear 18 secured to the shaft 17. The lever is pivotally secured as at 22 to one of the supports 16 and its opposite end is provided with a roller 23 which engages externally with a suitably shaped cam 24 supported beneath the table 13. This cam 24 is of general semicircular shape and through the lever 23, the gears 21, 18 and the shaft 17, it serves to move the fish compressing member 19 downwardly to a position whereby it engages with the upper surface of the fish then located in the receiver 15. Complementary to the cam 24 is another cam 25 of general semicircular shape which is engaged internally by the roller 23 of the lever 20 after the said roller disengages with the cam 24. This latter cam serves to raise the fish compressing member 19 upwardly preparatory to its succeeding compressing operation. The movement of the fish compressing members 19 is such that they are in raised positions above the fish receivers 15 when the fish are being deposited therein. The movement of each of the compressing members 19 in a downward direction takes place after the second deposit of fish is made, this being when the receiver 15 passes the discharge opening 11' in the receptacle 11. It will be noted in Fig. 1 that the fish compressing members 19 assume different positions depending upon where they happen to be with respect to the points where the fish is admitted to the receivers 15 and where it is subsequently compressed preparatory to being transferred into a can.

Arranged in a predetermined position with respect to the discharge opening 11' of the receptacle 11 is a can delivery chute 26 which has its open discharge end positioned directly above a duplex ring-shaped track 27 secured to and carried circularly by the arms 14 (see Fig. 6). The track 27 has a plurality of uniformly spaced grooves 27' each of which is adapted to receive a can C dropping onto the track from the delivery chute 26. The lower end of the can delivery chute 26 has an opening 26' at one side which allows a can C then lodged in a groove 27' to be carried by the circularly moving track 27 past the said chute (see Fig. 6). Directly after the movement of a can C beyond the can delivery chute, the transfer of the compressed fish into the can is accomplished. Each arm is equipped with the same transfer means. Slidably mounted on each arm for outward and inward reciprocating motion through a fish receiver 15 is a pusher or plunger 28 which has a connecting rod portion extending through a supporting guide 29 on the arm. The pusher 28 is rigidly connected to a depending rod 30 extending through a slot in the arm and having a roller 31 at its lower end which engages exteriorly with a suitably shaped cam 32 supported beneath the table 13 in a position inwardly from the cam 24. A complementary cam 32' is engaged internally by the roller 31 to return the pusher to its normal position. The cam 32 is of general semicircular shape and through the roller 31 and the rod 30 it serves to move the pusher 28 outwardly against the fish then held in a compressed position inside the receiver 15. Through the cam 32 the outward movement of the pusher 28 is timed so that the compressed fish then clamped in the receiver 15 by the compressing member 19 will be pushed into the can C through the latter's inwardly disposed open end. The action of the pusher 28 in an outward direction and then inwardly is quite fast and such movement is so synchronized with respect to the compressing member 19 that the latter is in its extreme downward compressing position when the pusher is moved outwardly. Thus the compressed fish is automatically transferred into the can without loss of any substantial portion thereof. As the cans C with the fish therein are carried further in a counter-clockwise direction, they successively come to a circular rotating knife 33 which is so positioned as to cut off any excess fish which might be protruding from the open end of the can.

In order to brace the cans C and to maintain them against displacement when the pushers 28 are actuated to transfer the compressed fish thereto, a semicircular member 34 is arranged to engage with the closed ends of the cans at points where there will be an outward pressure from the pushers. The circular member 34 extends partially around the track 27 and merges into and provides one side of a can discharge chute 35. The continued circular movement of the filled cans C brings them to the discharge chute 35 into which they are suitably directed for transfer to a processing unit or cooker.

An electric motor 36 connected in the usual manner by suitable pulleys, belts, gears and cams to the various parts of the apparatus causes their timely operation to bring about the results attained. It is contemplated that suitable spraying apparatus be arranged at an advantageous location to further clean the fish either before or after their transfer to the receivers 15. It is also to be understood that various other products other than fish may be satisfactorily automatically transferred into cans by means of our improved machine.

Having described our invention, what we claim is:

1. In a produce canning machine, a carrier mounted for rotation about a substantially vertical axis, a plurality of radially disposed spaced arms on the carrier, an open top produce receiver on the outer end of each arm, means for delivering produce to the receivers, a compressing element pivoted on each arm and arranged for movement toward the produce receiver on said arm, whereby the produce in the receiver may be engaged and compressed, can delivery means for delivering open cans to the carrier, means for arranging the cans in positions whereby they may receive the compressed produce from the receivers, means on each arm and synchronized with the carrier and the compressing elements for forcing the produce from the receivers into the cans while the compressing elements are in engagement with the produce in the receivers.

2. In a produce canning machine, a rotatable carrier having a plurality of sets of produce receivers, produce compressors, and produce discharging members mounted thereon, means for delivering produce to the receivers, two stationary cam rings arranged beneath the carrier, separate means associated with each compressor and arranged in engagement with one of the cam rings for progressively actuating its associated compressor to and from an engaging position with respect to the produce in its associated receiver, and separate means associated with each produce discharging member and arranged in engagement with the other of the cam rings for actuating its associated discharging member to and from a discharging position, the means for actuating the compressors and the discharging members being synchronized to effect the discharge of produce from the receivers when the compressors have compressed the produce therein.

3. In a fish canning machine, an endless conveyor for conveying fish placed thereon to a point where they are discharged, an open fish receiver provided with a substantially horizontal flat bottom and arranged to receive fish discharged from the conveyor and having a discharge opening in the said bottom, and a star wheel mounted for rotary movement in the receiver, the said star wheel having radially disposed members arranged to engage with the fish discharged onto the bottom of the receiver and carry them to the discharge opening in said bottom.

4. In a fish canning machine, an endless conveyor for conveying fish placed thereon to a point of discharge, an open fish receiver having a substantially horizontal bottom arranged to receive fish discharged from the conveyor, the said bottom of the receiver having a discharge opening, a star wheel mounted for rotary movement in the receiver and having radially disposed members arranged to engage with fish discharged into the receiver, the said radially disposed members being arranged to successively discharge one or a number of fish through the discharge opening in the bottom of the receiver, a carrier mounted for rotary movement beneath the receiver, a number of open fish receptacles on the carrier and arranged to successively receive fish discharged from the receiver, a compressor element associated with each receptacle for compressing fish received thereby, and a pusher element associated with each receiver for discharging the compressed fish therefrom.

5. In a produce canning machine, a carrier mounted for rotary movement about a substantially vertical axis, a plurality of open produce receivers arranged to be carried along a circular path by the carrier, produce delivery means for depositing produce into the open produce receivers, a compressing member synchronized with and mounted on the carrier and associated with each produce receiver, each compressing member being arranged to engage with the produce in its associated receiver at predetermined points along the path of travel of the receivers, and a plunger mounted on and synchronized with the carrier and associated with each compressing member and arranged to be actuated when its associated compressing member is in engagement with the produce in its associated receiver, whereby the produce in the receiver may be discharged therefrom while in a compressed state.

MAX K. KUTHER.
JAMES LEONARD SMITH.

REFERENCES CITED

The following references are of record in the file of this patent:

UNITED STATES PATENTS

| Number | Name | Date |
|---|---|---|
| 556,188 | Holland | Mar. 10, 1896 |
| 1,891,870 | Dodge | Dec. 20, 1932 |
| 2,015,089 | Rooney | Sept. 24, 1935 |